United States Patent [19]

Shiozawa

[11] Patent Number: 6,071,125
[45] Date of Patent: Jun. 6, 2000

[54] APPARATUS FOR SUPPLYING ELECTRIC POWER TO ROTARY MEMBER AND BRUSH BELT FOR USE WITH SAME

[76] Inventor: Tsuneo Shiozawa, No. 413-1, Aioicho 2-Chome, Kiryu City, Gunma, Japan

[21] Appl. No.: 09/088,853

[22] Filed: Jun. 2, 1998

[30] Foreign Application Priority Data

Jun. 30, 1997 [JP] Japan .................................. 9-189307

[51] Int. Cl.[7] ............................................. H01R 39/00
[52] U.S. Cl. ............................ 439/26; 439/28; 439/13; 439/23; 310/242
[58] Field of Search .......................... 439/13, 23, 24, 439/25, 26, 28, 29; 310/242, 248, 251

[56] References Cited

U.S. PATENT DOCUMENTS

| | | | |
|---|---|---|---|
| 2,316,652 | 4/1943 | Moeller | 439/13 |
| 4,347,456 | 8/1982 | Chabrerie | 310/248 |
| 4,358,699 | 11/1982 | Wilsdorf | 310/251 |
| 5,112,248 | 5/1992 | Kibblewhite et al. | 439/13 |
| 5,712,552 | 1/1998 | Niimi | 310/248 |
| 5,744,889 | 4/1998 | Niimi | 310/242 |

FOREIGN PATENT DOCUMENTS

| | | |
|---|---|---|
| 53/1557 | of 1978 | Japan . |
| 59/83839 | 5/1984 | Japan . |
| 63/30530 | 6/1988 | Japan . |

*Primary Examiner*—Paula Bradley
*Assistant Examiner*—Katrina Davis
*Attorney, Agent, or Firm*—Dilworth & Barrese

[57] ABSTRACT

In order to provide a more cost effective electric power supplying apparatus simpler in structure and operation, the apparatus 1 is constituted by attaching an electric power receiving part to an electric power supply part 2. The electric power receiving part comprises a shaft 7 provided on the end of a rotary member 3 at the rotational center thereof. The electric power supply part 2 comprises brush belts 5 each including a plurality of flexible linear conductive elements arranged so as to abut against the peripheral surface of the shaft 7.

19 Claims, 3 Drawing Sheets

APPARATUS FOR SUPPLYING ELECTRIC POWER TO ROTARY MEMBER AND BRUSH BELT FOR USE WITH SAME

BACKGROUND OF THE INVENTION

1. Field of the Invention

The present invention relates generally to an apparatus for supplying an electric power to a rotary member and a brush belt for use with the same, and more particularly to an apparatus for supplying an electric power to a rotary member such as an electromagnetic clutch or an alternator and a brush belt used for the rotary member.

2. Description of the Related Art

One of the rotary member is for instance an electromagnetic clutch. In the case of automobile air conditioners, the power is derived via the electromagnetic clutch from an engine. The major electromagnetic clutches being presently manufactured are of a so-called fixed coil type in which a gap is defined between the fixed coil and the rotor part, by way of which rotor there is attracted an armature generating a rotational force (torque). Some electromagnetic clutches are of a coil-rotation type in which the coil itself is rotated with the power from the engine.

However, no matter whether such an electromagnetic clutch is of the fixed coil type or the coil-rotation type, it generally employs a slip ring brush system as the method of supplying an electric power to the electromagnetic coil. Therefore, some manners of abutment of the brush against the slip ring may result in an insufficient electric capacity or in the breakage of the tip of the brush. The former would occur if the tip of the brush could not abut in parallel against the overall surface of the slip ring. The latter would take place if the tip of the brush abutted obliquely against the surface of the slip ring. Furthermore, some strengths of the abutment of the brush tip against the surface of the slip ring may result in early wear of the brush tip, resulting in the deposit of brush wear dusts. In particular, in case of a high-speed rotation of the electromagnetic coil, the electric power receiving part may be subjected to the early wear. Also, the coil rotation type slip ring system has not yet been prevailing since it is affected by the variations in the number of rotations of the engine, vibrations, temperatures, dusts, oils and droplets.

In view of such circumstances, there was proposed a tubular member (roller) which is rotatably mounted on a shaft provided on the end of the rotary member at its rotational center, the tubular member having an electric power supply part removably attached thereto (see Japanese Patent Pub. No. sho63-30530).

Although such means using the above tubular member can deal with such circumstances no matter whether they employ the fixed coil type or the coil-rotation type, it would be troublesome to carry out them due to too large a number of constituent parts as well as to a higher processing accuracy required. It is thus desired to somewhat simplify them with respect to the structure, operation and costs.

SUMMARY OF THE INVENTION

The present invention was conceived in order to overcome the above problems. The completion of the present invention defined hereinbelow will make it possible to achieve the object with extremely simple means without any need for a large number of components or complicated operations.

The present invention ensures a secure contact irrespective of the conditions of abutment against the peripheral surface of the shaft provided at the rotational center on the end of the rotary member serving as the electric power receiving part. It further ensures an easy attachment to the electric power receiving part comprising of the shaft and uses as an electric power supply part a member having an extremely simplified structure and a less number of components, the member including bundles of a plurality of flexible linear conductive elements so as to increase the rigidity to exhibit intermediate nature between pure flexible elements and pure rigid elements. Thus, by virtue of the use of the bundles of only the flexible linear conductive elements in order to exhibit an intermediate nature between the pure flexible elements and the pure rigid elements there is ensured the provision of a preferred and appropriate electric power supplying apparatus having a simplified structure irrespective of the conditions such as the orientation of the abutment against the peripheral surface of the shaft or abutting strength.

As used herein, the rotary member of the present invention refers to, e.g., electromagnetic clutches or alternators, in which a current flows through the rotating shaft provided at the rotational center on the end thereof, no matter whether it is of the fixed coil type or coil-rotation type.

According to an aspect of the present invention there is provided an apparatus for supplying an electric power to a rotary member, the apparatus comprising an electric power receiving part including a shaft provided on the end of the rotary member at the rotational center thereof; and an electric power supply part including a brush belt consisting of a plurality of flexible linear conductive elements arranged so as to abut against the peripheral surface of the shaft. Such a brush belt consisting of a plurality of flexible linear conductive elements can be independent of the abutment conditions since the linear conductive elements can come into contact with the significant area of the peripheral surface of the rotating shaft while being deformed in conformity with the contour of the shaft. The linear conductive elements in the brush belt can be linear conductive elements made of, e.g., copper or molybdenum having a higher electric conductance and a higher wear resistant property and capable of being easily deformed by pressing.

The brush belt may include a thin base plate carrying thereon a plurality of flexible linear conductive elements in an upright manner so as to abut against a part of the peripheral surface of the shaft. Alternatively, the brush belt may include a thin base plate carrying thereon a plurality of flexible linear conductive elements in an upright manner, the thin base plate being rolled into a tube so that the linear conductive elements can abut against a plurality of parts of the peripheral surface of the shaft. The plurality of linear conductive elements may be provided over the entire surface of the thin base plate or may be provided in a discrete manner thereon in the form of two or three bundles. In this instance, the provision of the linear conductive elements over the entire surface of the thin base plate would allow the tips of the linear conductive elements to come into intimate contact with the overall periphery of the rotating shaft. In case of discrete provision of the two or three bundles of the linear conductive elements on the thin base plate, the side portions in the vicinity of the tips of the linear conductive elements will be allowed to abut against the rotating shaft in two or three directions.

In cases where two or three bundles of the linear conductive elements are disposed on the thin base plate of the brush belt in a discrete manner, it is preferable that the outer sides of the bundles of the linear conductive elements be provided integrally with linear resilient elements extending so as to cover at least a part thereof. The linear resilient elements to be provided on the outer sides of the linear conductive elements can be, e.g., piano wires having a high wear resistant property and a high resiliently restoring property although it can easily be deformed by pressing.

Moreover, the brush belt may entirely be housed in a case so as to eliminate the influence of the dusts, oils, droplets, etc.

BRIEF DESCRIPTION OF THE DRAWINGS

The above and other objects, aspects, features and advantages of the present invention will become more apparent with reference to the accompanying drawings, in which.

DESCRIPTION OF THE PREFERRED EMBODIMENTS

An embodiment of present invention will now be described with reference to the accompanying drawings.

Figure 1:
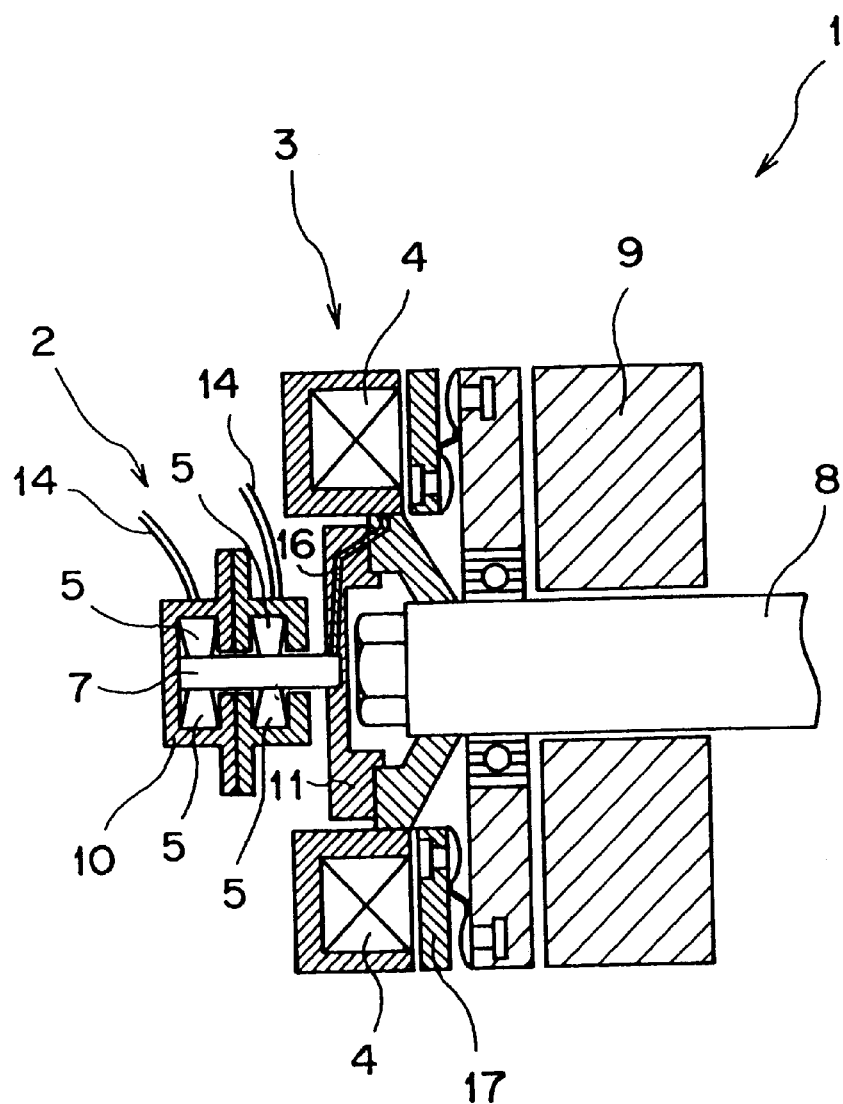
FIG. 1 is a longitudinal sectional side elevation of an electric power supplying apparatus in accordance with the present invention.

FIG. 1 illustrates an electromagnetic clutch 3 in the form of a coil-rotation-type rotary member for use in automobile air conditioners, in which clutch 3, a power from an automobile engine, is transmitted via a pulley not shown to a driving member 8 extending through a compressor 9. The tip of the driving member 8 is provided with a coil mounting plate 11 carrying thereon an electromagnetic coil 4, which is rotated together with the rotation of the automobile engine. The coil mounting plate 11 is provided at its rotational center with an electric power receiving part in the form of a rod-like shaft 7 made of a composite element of an electrically conductive material through which positive and negative electricities flow and an insulating material, the electric power receiving part being connected via a power transmitting harness 16 to the electromagnetic coil 4. It is to be appreciated that although this embodiment employs a two-wire system consisting of positive and negative wires, a single wire earth system could naturally be employed.

The electric power receiving part in the form of the rod-like shaft 7 is mounted with an electric power supply part 2. The electric power supply part 2 comprises two tubular brush belts 5 each wholly fixedly housed in a case 10, each brush belt 5 consisting of a thin base plate 6, which plate 6 is made of a flexible synthetic resin or the like and carries thereon a plurality of upright linear conductive elements 12 made of, e.g., copper having a high electrical conductance, the thin base plate 6 being annularly rolled in such a manner that the linear conductive elements 12 are directed inward and brought into abutment against the periphery of the shaft 7. To the brush belts 5 are connected lead wires 14 extending through a protection tube not shown to a power source so that the brush belts 5 can be supplied with electric power in response to control signals. The case 10 accommodates therein not only the brush belts 5 but also the shaft 7 and is retained by an whirl-stop arm serving as the protection tube not shown.

Figure 2A:
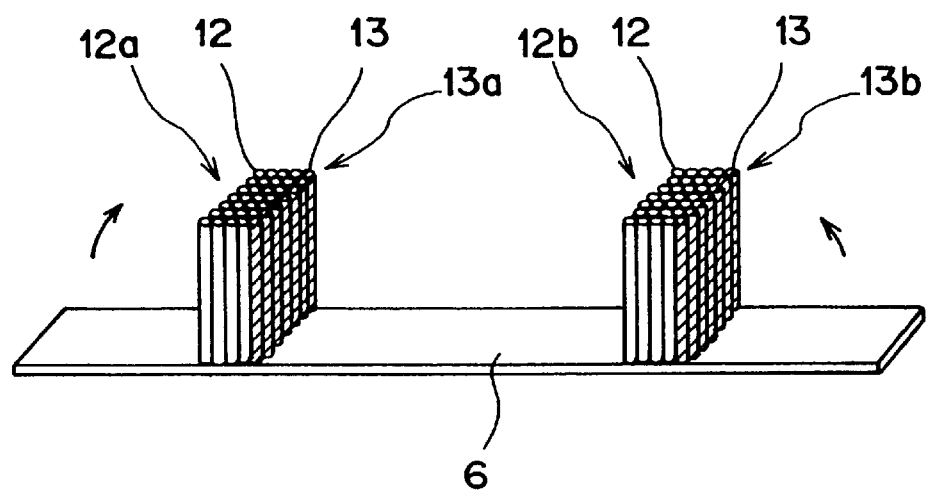
FIGS. 2A and 2B are a developed perspective view and a longitudinal sectional side elevation, respectively, illustrating a brush belt in accordance with the present invention.
Figure 2B:
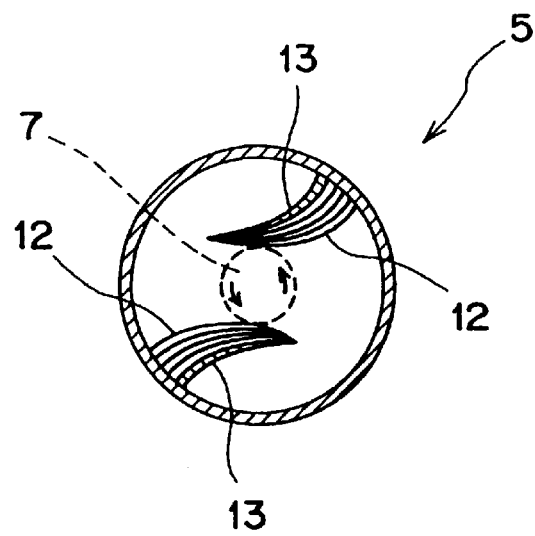
Figure 3A:
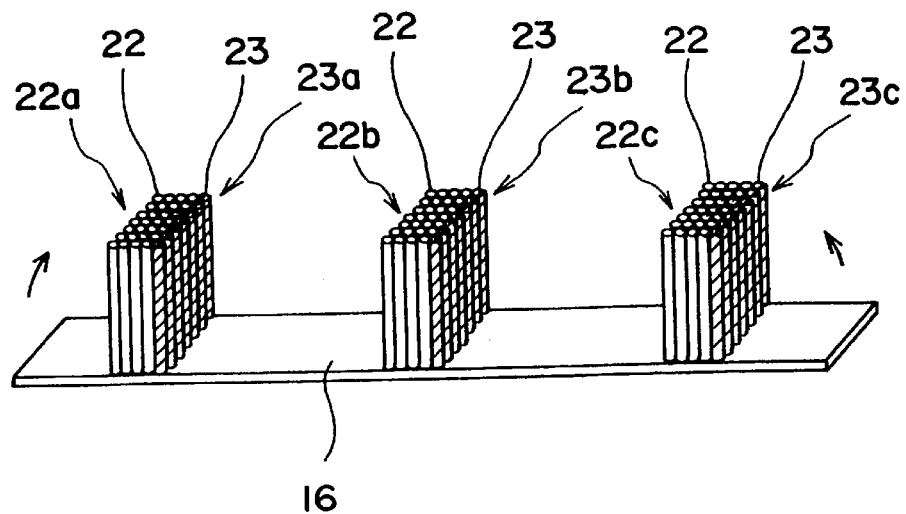
FIGS. 3A and 3B are a developed perspective view and a longitudinal sectional side elevation, respectively, illustrating another brush belt in accordance with the present invention.
Figure 3B:
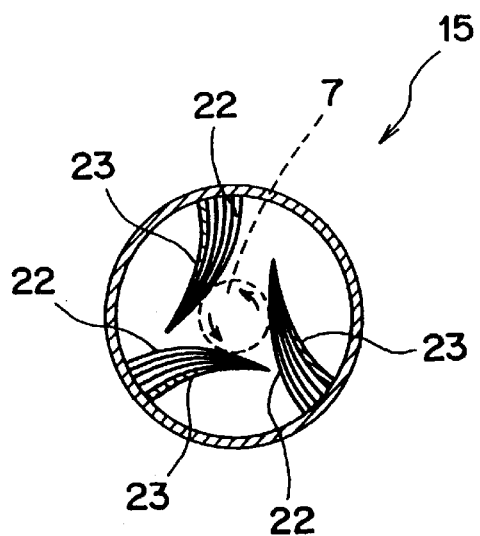

In order to form the brush belts 5, only the linear conductive elements may be arranged on the entire surface of the thin base plate. As shown in FIGS. 2A and 2B, however, two bundles 12a and 12b of the linear conductive elements 12 may be placed on the thin base plate 6 in a discrete manner. In the latter case, to maintain the linear conductive elements 12 in their upright conditions, bundles 13a and 13b of linear resilient elements 13 made of, e.g., piano wires may be integrally provided on the outside of the linear conductive element bundles 12a and 12b, respectively, so as to extend over at least a part thereof so that side portions of the linear conductive elements in the vicinity of their tips can come into contact with the rotating shaft in two or more directions. The linear resilient elements 13 should have a high wear-resistant property and present a large resiliently restoring force although they are easily deformable by pressing. It is to be appreciated that the linear resilient elements 13 are preferably provided in such a manner as to cover at least the rear outer sides of the bundles of the linear conductive elements 12 which are intended to be bent by the rotating shaft. Alternatively, as shown in FIGS. 3A and 3B, three bundles 22a, 22b and 22c of linear conductive elements 22 may be arranged on a thin base plate 16 in a discrete manner, with bundles 23a, 23b and 23c of linear resilient elements 23 being integrally provided in such a manner as to cover at least the rear outer sides of the bundles of the linear conductive elements 22. The thin base plate 16 is then rolled into a tube in the form of a brush band 15 allowing the side portions of the linear conductive elements in the vicinity of their tips to come into contact with the rotating shaft in three or more directions.

An electric power supplying apparatus is generally designated at 1 and is constituted by attaching the electric power supply part 2 to the shaft 7 of the electric power receiving part. The electric power supplying apparatus 1 has a circuit including in the mentioned order the lead wires 14, the brush bands 5, the shaft 7, the electric power transmitting harness 16, the electromagnetic coil 4, a rotator (an armature) 17 and the compressor 9. When the electromagnetic coil 4 is rotated via the driving member 8 when the power from the automobile engine is supplied with electric power for energization in response to a control signal, it attracts the rotator 17 and rotates it in synchronism, allowing the transmission of the power to the compressor 9 to activate the automobile air conditioner. Then, the deenergization of the electromagnetic coil 4 in response to a control signal results in no transmission of power to the compressor 9, bringing the automobile air conditioner to a stop.

Then, in order to check the conditions of the brush belts in the electric power supplying apparatus, a 12 mm long and 4 mm diameter shaft was used and rotated at 3000 rpm. As a result, it has proved that there is no fear of the brush belts rising up with vibration as in the conventional solid brushes and no fear of oils or dusts adhering thereto since they are entirely accommodated in the case. The same test has been conducted using the same shaft at 35000 rpm. The result was that the brush belts have suffered from no extraordinary phenomena.

The thus configured present invention is independent of the abutment conditions since the linear conductive elements can abut against the significant area of the periphery of the rotating shaft while being deformed in conformity with the contour of the shaft. In addition, the simple structure consisting of the thin base plate and the linear conductive elements will contribute to a remarkable curtailment in the material cost, processing cost, etc.

By virtue of the employment of the coil-rotation type free from the influence of variation in the number of rotations of the engine, vibrations, temperatures, dust, oils, droplets, etc., unlike the slip ring brush type, there is no need to provide a rotor as in the fixed-coil type, resulting in a remarkable reduction in the weight, to realize a reduced volume of coil without needing any magnetic force in the gaps defined in the rotor parts.

Furthermore, the reduced volume of coil will lead to a reduction in the diameter of the coil, making it possible to provide for the high-speed rotation.

Naturally, while the principle of the present invention remains the same, the details of the construction and the embodiments may widely vary with respect to what has been described and illustrated purely by way of example, without departing from the scope of the present invention which follows.

What is claimed is:

1. An apparatus for supplying electric power to a rotary member, said apparatus comprising:

an electric power receiving part including a shaft provided on the end of said rotary member at the rotational center thereof; and an electric power supply part including a brush belt consisting of a bundle including a plurality of flexible linear conductive elements arranged in an upright manner so as to abut against the peripheral surface of said shaft, wherein said brush belt consists of a thin base plate carrying thereon, said bundle including said plurality of flexible linear conductive elements in the upright manner, said thin base plate being rolled into a tube so that said plurality of linear conductive elements come into abutment against the peripheral surface of said shaft.

2. An apparatus for supplying electric power to a rotary member according to claim 1, wherein said brush belt is housed in a case.

3. An apparatus according to claim 1, additionally comprising a compressor through which said rotary member extends, said compressor arranged to activate an air conditioner, a coil mounting plate situated on a tip of said rotary member;

an electromagnetic coil carried on the coil mounting plate;

a power transmitting harness connected to the rotating shaft and said electromagnetic coil connected to the power transmitting harness, said apparatus structured and arranged to activate an automobile air conditioner with power from an automobile engine.

4. The apparatus of claim 1, wherein said linear conductive elements are constructed of copper or molybdenum.

5. A brush belt comprising:

a thin base plate carrying thereon a bundle including a plurality of flexible linear conductive elements in an upright manner, said thin base plate being rolled into a tube with said flexible linear conductive elements directed inward.

6. The brush belt of claim 5, wherein said linear conductive elements are constructed from copper or molybdenum.

7. An apparatus for supplying electric power to a rotary member accordign to claim 1, wherein said thin base plate of said bursh belt carries thereon at least two discrete bundles of said linear conductive elements.

8. An apparatus for supplying electric power to a rotary member according to claim 7, wherein each of said bundles of said linear conductive elements is integrally provided on its outer side with linear resilient elements extending so as to cover at least a part thereof.

9. An apparatus for supplying electric power to a rotary member according to claim 7, wherein said brush belt is housed in a case.

10. An apparatus for supplying an electric power to a rotary member according to claim 7, comprising at least three discrete bundles of said linear conductive elements.

11. An apparatus for supplying electric power to a rotary member according to claim 10, wherein each of said bundles of said linear conductive elements is integrally provided on its outer side with linear resilient elements extending so as to cover at least a part thereof.

12. An apparatus for supplying electric power to a rotary member according to claim 11, wherein said brush belt is housed in a case.

13. The apparatus of claim 11, wherein bundles of said linear resilient elements are integrally arranged on outer sides of said linear conductive element bundles from the shaft and extend over at least a part thereof such that side portions of said linear conductive elements in the vicinity of tips thereof can come into contact with the rotating shaft in two or more directions.

14. A brush belt according to claim 5, wherein said thin base plate carries thereon at least two discrete bundles of said linear conductive elements.

15. A brush belt according to claim 14, wherein each of said bundles of said linear conductive elements is integrally provided on its outer side with linear resilient elements extending so as to cover at least a part thereof.

16. A brush belt according to claim 14, comprising at least three bundles of said linear conductive elements.

17. A brush belt according to claim 16, wherein each of said bundles of said linear conductive elements is integrally provided on its outer side with linear resilient elements extending so as to cover at least a part thereof.

18. A brush belt according to claim 17, wherein bundles of said linear resilient elements are provided in a manner to cover at least a rear outer side of said bundles of said linear conductive elements such that said linear conductive elements are arranged to be bent by a rotating shaft.

19. The belt of claim 17, wherein said linear resilient elements are constructed of piano wire.

* * * * *